(Model.)
T. CRISPIN.
BENCH DOG.
No. 307,440. Patented Nov. 4, 1884.
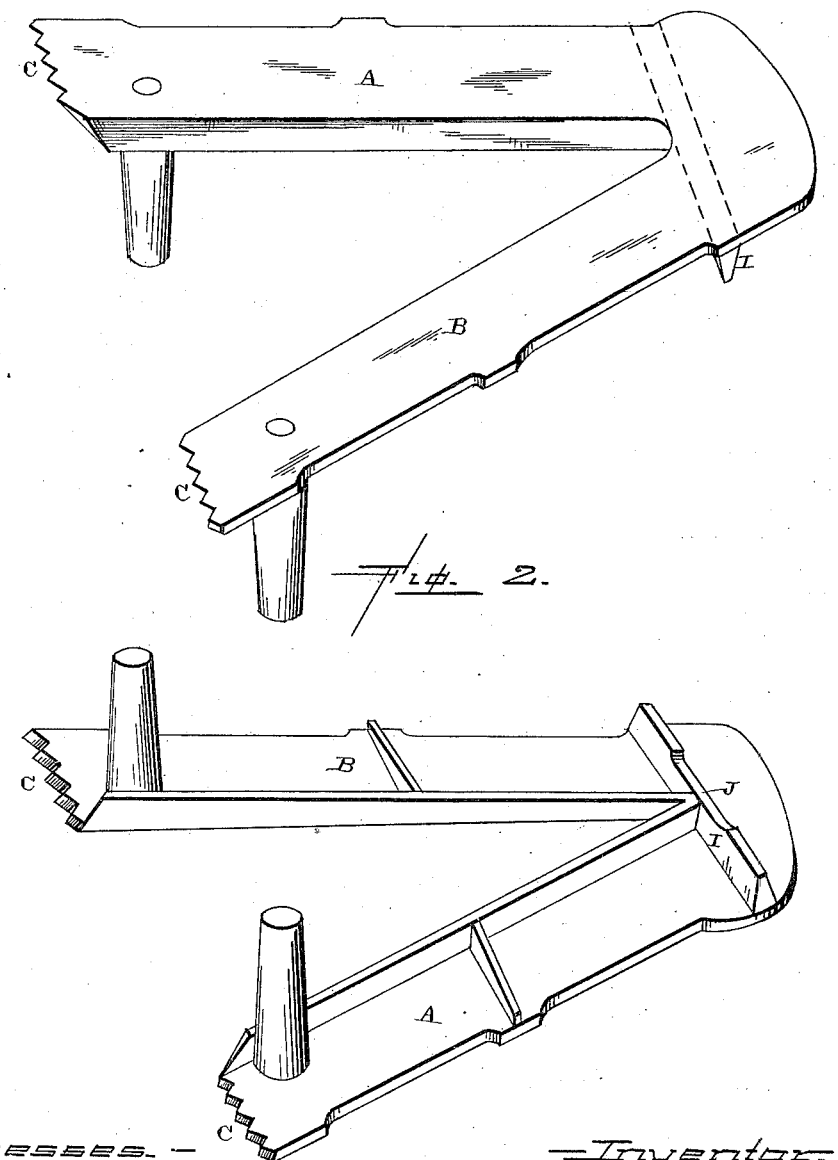
Witnesses.
L. F. Gardner
A. S. Pattison
Inventor.
Thos. Crispin
per
F. A. Lehmann,
atty

UNITED STATES PATENT OFFICE.

THOMAS CRISPIN, OF DETROIT, MICHIGAN.

BENCH-DOG.

SPECIFICATION forming part of Letters Patent No. 307,440, dated November 4, 1884.

Application filed June 7, 1884. (Model.)

*To all whom it may concern:*

Be it known that I, THOMAS CRISPIN, of Detroit, in the county of Wayne and State of Michigan, have invented certain new and useful Improvements in Bench-Dogs; and I do hereby declare the following to be a full, clear, and exact description of the invention, such as will enable others skilled in the art to which it pertains to make and use it, reference being had to the accompanying drawings, which form part of this specification.

My invention relates to an improvement in bench-dogs; and it consists in a dog having two bearing-points and a suitable space between the points, and having studs on its under side to catch in holes bored in the bench-top, and which also has an opening on the under side of the part which bears on the bench to allow dust or fine shavings to pass through instead of gathering in and filling up the jaws of the dog, all of which will be more fully described hereinafter.

The object of my invention is to provide a bench-dog which can be quickly placed in position when wanted and removed when no longer needed, which has two bearing-points for the purpose of preventing the board which is being dressed from skewing around, and which has an opening between the two bearing-points so as to receive the corner of the board and hold it, as the board is being dressed, upon its edge.

Figure 1 is a perspective of a dog embodying my invention. Fig. 2 is a similar view, taken from its under side.

A B represent the two jaws of the dog, both of which are formed in a single piece, and each of which has the usual bearing-point, C. Upon the under side of each jaw is formed a suitable stud or projection, which studs are intended to catch into holes bored in the top of the bench, and thus hold the dog in position while in use. As soon as no longer needed the dog can be at once removed, so as not to be in the way. If the holes are made any distance from the end of the bench the dog can be reversed, so as to be used from either direction. When the board is lying flat upon the bench and is being dressed, and its end bears against both points, it is thus squarely held, so as to prevent it from skewing around, the two bearing-surfaces serving to hold the board upon two points instead of one, as is generally the case. The two bearing-points being separated a suitable distance apart when the board is being dressed upon its edge, the lower corner is made to catch in between the opening between the bearing-points, where it will be squarely held. The rear end of the dog is held raised above the bench by means of the vertical flange I, and through the under side of this vertical flange is made an opening, J, the object of which is to allow the dust or fine shavings to pass through instead of gathering in and filling up the jaws of the dog. The dog will be braced by suitable flanges, which may extend across its surface or in a line with its length, as may be desired. While the dog is in use the outer jaw is parallel with the front edge of the work-bench.

I am aware that a bench-dog having three inclined projections for catching in the bench and provided with two bearing-points is not new, and this I disclaim.

Having thus described my invention, I claim—

1. A bench-dog having one of its two arms shorter than the other, so that the outer edge of the shorter arm will extend parallel with the edge of the bench, substantially as shown.

2. A bench-dog having one of its two arms shorter than the other and provided with the projections to catch in the bench, and having its rear edge raised above the top of the bench by the cross-flange J, substantially as set forth.

3. A bench-dog having two bearing-surfaces and the studs or projections to hold it in place, and having a vertical flange on the under side of its rear end, and an opening through the flange, substantially as specified.

In testimony whereof I affix my signature in presence of two witnesses.

THOMAS CRISPIN.

Witnesses:
FELIX A. FUNKIE,
WILLIAM T. WEITZ.